(12) United States Patent  
Martinelli (10) Patent No.: US 7,705,734 B2
(45) Date of Patent: Apr. 27, 2010

(54) SECURE PRODUCT PACKAGING

(76) Inventor: Lawrence G. Martinelli, 5052 Woodland Dr., Placerviall, CA (US) 95667

( * ) Notice: Subject to any disclaimer, the term of this patent is extended or adjusted under 35 U.S.C. 154(b) by 701 days.

(21) Appl. No.: 11/643,476

(22) Filed: Dec. 21, 2006

(65) Prior Publication Data

US 2008/0149584 A1    Jun. 26, 2008

(51) Int. Cl.
G08B 13/14    (2006.01)
(52) U.S. Cl. ............. 340/572.8; 340/572.1; 340/572.7; 340/572.9; 235/457; 235/568; 235/227.27; 235/223 B; 215/201; 215/202; 428/35.1; 356/71; 356/73
(58) Field of Classification Search ............. 340/572.1, 340/572.7, 572.8, 572.9; 215/201, 202, 209, 215/237.1, 263; 356/71, 73, 375; 428/35.1; 235/375, 435–462.34
See application file for complete search history.

(56) References Cited

U.S. PATENT DOCUMENTS 4,642,254 A * 2/1987 Walker ................. 428/35.1
5,825,475 A * 10/1998 Formosa ................. 356/71
2003/0218739 A1* 11/2003 Saglimbeni et al. .......... 356/73
2005/0127155 A1* 6/2005 Claessens et al. ........... 235/375
2006/0145862 A1* 7/2006 Norman ................. 340/572.8

* cited by examiner

Primary Examiner—George A Bugg
Assistant Examiner—Sisay Yacob
(74) Attorney, Agent, or Firm—Law Office of Thomas E. Schatzel A Prof. Corp.

(57) ABSTRACT

A product packaging comprises a cap on a transparent bottle to seal in a protected product. The cap includes an RFID chip and antenna that can report a serial number and product identification code to a nearby scanner. Reports from several such scanners in the distribution chain from manufacturer to retailers are logged and used to validate legitimate products by their movements. The caps are designed such that when opened the RFID antenna will break away from its associated RFID chip. The cap is molded of cross-linked polymers with a memory that makes it impossible to reseat it properly to the bottle once removed. A hologram target is placed backwards under a label on the side of the bottle so a laser beam can be directed through the backside of the bottle, through the contents, and to the hologram. The reflected laser light will have a signature that is very sensitive to the exact chemistry of the contents. Adulterations and fake products substituted for the genuine articles inside the bottle are detectable using non-invasive hologram reflected laser light and analysis.

17 Claims, 6 Drawing Sheets

SECURE PRODUCT PACKAGING

BACKGROUND OF THE INVENTION

1. Field of the Invention

The present invention relates to product packaging, and in particular to methods, systems, and devices for resisting all physical attempts at entering or removing the product packed in a container, closed with such device, and for verifying and assuring that the contents of a package are genuine and unadulterated.

2. Description of the Prior Art

Lisa Lerer wrote in *IP Law & Business* magazine that radio frequency identification device (RFID) technology is being touted as a counterfeiting cure-all, but says this new technology is hardly more than a placebo. "Bad Medicine," September 2006 issue, pp. 26-30. Pfizer's popular LIPITOR medicine has been the subject of wide-spread counterfeiting, and in 2003 the US-FDA had 18-million fake LIPITOR tablets recalled. It was estimated more than 600,000 Americans had received some counterfeit pills before the recall. As a result, Pfizer launched a $5-million program to test RFID on VIAGRA packaging.

Lisa Lerer despairs that RFID won't stop counterfeiting because RFID tracks packaging and not the pills themselves. She says savvy pirates can still sneak fakes into legitimate boxes, and for pharmaceutical companies facing serious counterfeiting problems, RFID is little more than a placebo.

Previous attempts at using polymer materials in secure cap systems have been far less than favorable because untreated polymer components exhibit "creep" or movement away from the points of stress. In vital medical packaging, such creep represents a potential loss of sterilization seal integrity. Since high temperatures are required to sterilize the finished products, the creep effect can be greatly accelerated by the necessary heating. The conventional polymers soften such that the plastic parts will loose their strength and rigidity. They can relax, or literally melt away from the points of stress. The joints and seals place the polymers under stress, and it these points that will be the first to fail.

In just today's pharmacological market, there are many lifesaving medications that retail to the end-customer patient for $1,000-$1,850 per month for only a five milliliter doses of medication. Such has enticed far too many unscrupulous individuals, including at least one US pharmacist, to dilute fully authentic and authorized medications so the diluted compounds could be sold several times to several patients.

So what is needed is a reasonably priced, multi-phased polymer based packaging system for a vial, bottle, jar, etc, that cannot be physically penetrated or removed and reused in a non-tamper-evident manner. Such system must prevent unscrupulous individuals or terrorists from passing-off faked or adulterated contents as legitimate. The physical preventative features should be supplemented by RFID protection components designed specifically to be integrated with mechanical locking, cross linked, and even crosslinked expanded polymer packaging and with tamper resistant/evident features.

A final assurance that is needed is a simple-to-use, non-invasive way to verify what is actually inside the protected package. Secure packaging systems with multi-phased safeguards would find immediate applications for high-end consumer cosmetics, pharmaceuticals, etc.

SUMMARY OF THE INVENTION

Briefly, a product packaging embodiment of the present invention comprises a cap on a transparent bottle to seal in a protected product. The cap includes an RFID chip and antenna that can report a serial number and product identification code to a nearby scanner. Reports from several such scanners in the distribution chain from manufacturer to retailers are logged and used to validate legitimate products by their movements in the chain of distribution. The caps are designed such that, when opened, the RFID antenna will break away from its associated RFID chip and disable its use. The cap is molded of cross-linked polymers with a memory that makes it impossible to reseat it properly to the bottle once removed. A hologram target is placed backwards under a label on the side of the bottle so a laser beam can be directed through the backside of the bottle, through the contents, and to the hologram. A three-dimensional binary optically encrypted hologram (BOE), diffracts and reflects the laser light with a signature that is very sensitive to the exact chemistry and even the temperature of the contents. Dilutions, adulterations, and fake products substituted for the genuine articles inside the bottle are non-invasively detectable by analyzing the laser light reflected from the BOE through the bottle and its contents.

An advantage of the present invention is that product packaging is provided to validate genuine products are really inside their containers.

Another advantage of the present invention is that the legitimacy of the contents of a container can be easily, reliably, repeatably, and readily ascertained non-invasively.

A further advantage of the present invention is product packages are provided that cannot be reclosed, and therefore prevent repackaging secure packaging products with fake products.

These and other objects and advantages of the present invention will no doubt become obvious to those of ordinary skill in the art after having read the following detailed description of the preferred embodiments which are illustrated in the various drawing figures.

DETAILED DESCRIPTION OF THE PREFERRED EMBODIMENT

Figure 1:
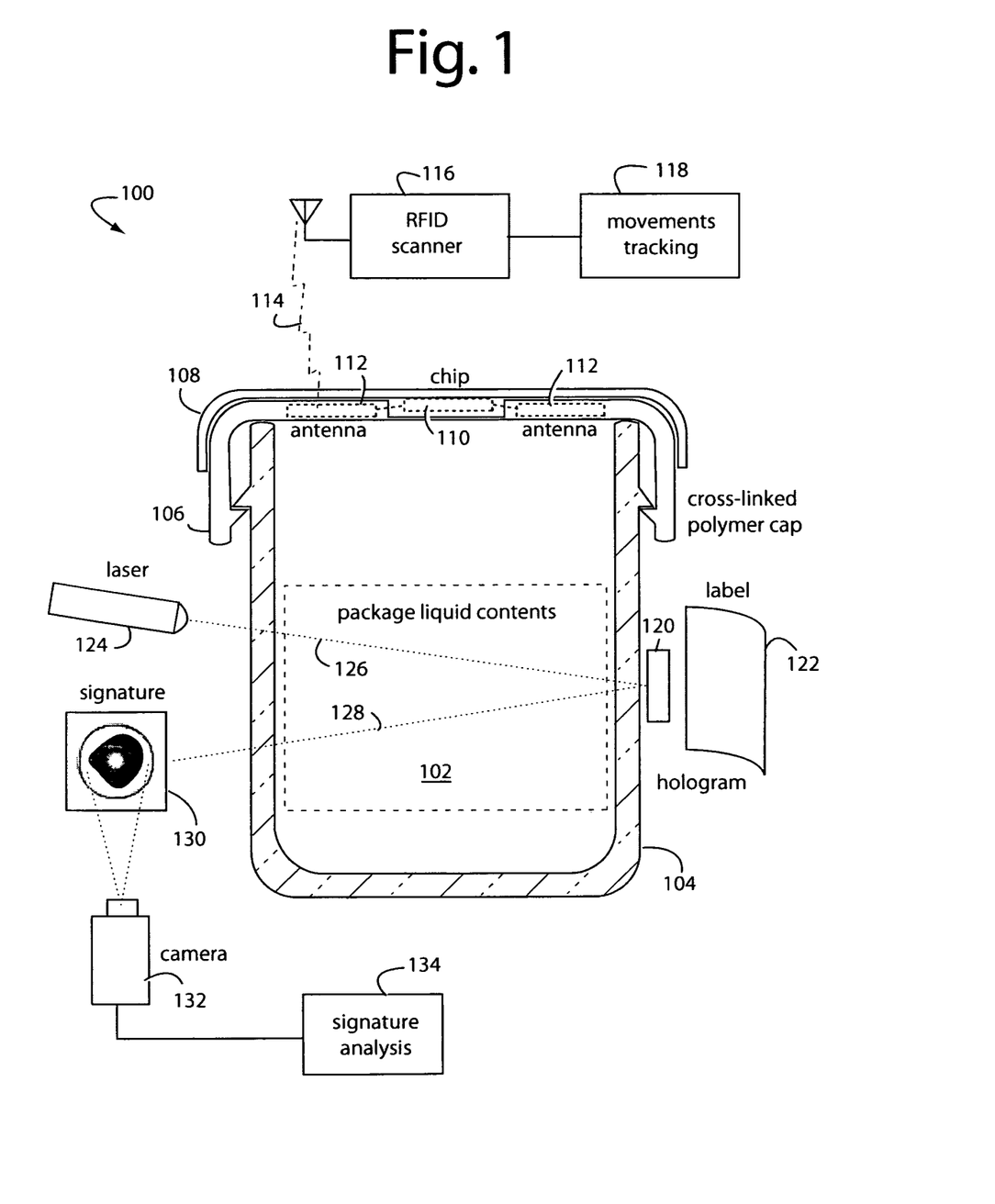
FIG. 1 is a functional block diagram of a secure packaging system embodiment of the present invention.

FIG. 1 represents a secure packing system embodiment of the present invention, and is referred to herein by the general reference numeral 100.

In general, embodiments of the present invention use various component parts that are molded from standard FDA-approved polymer resins. These are deliberately molded to be undersize or otherwise misshapen for the particular product application. The plastic components are assembled before being exposed to intense radiation, or by being treated with a cross-linking additive, which cross links the polymer molecules. The polymer strands will weld or bond together where they cross each other. Such cross-linking effectively locks a permanent memory into the parts that will act to always return the parts to their originally molded shapes, sizes and dimensions.

The assembled and cross-linked plastic parts are then heated to soften them so they can be stretched and pushed into their finished sizes and shapes. The heating has to be taken above the normal melting point of the pre-cross-linked material, e.g., the glass transition-temperature (Tg). Once softened, the parts can be expanded using a combination of vacuum, pressure and mechanical force in special fixtures for the purpose.

The parts are cooled to "freeze-in" a finished product size and shape that is a close match to the mating vial or bottle. Thereafter, the internally cross-linked polymer molecular strands will have a very strong spring tension that will pull the mass back into its original molded shape and size, and it will if it ever gets heated above its Tg temperature again.

Conventional non-cross-linked polymer strands will yield and relax away from mechanical stresses. Higher ambient temperatures and/or more applied stress will promote faster relaxations. In cross-linked polymers, the molecular "springs" work against the stress and pull the material and the parts in a fight to return them to their originally molded shape and configurations.

If a counterfeiter were to try to heat and soften the parts to make them easier to remove, the great molecular forces imparted by the cross-linked bonds will fight extremely hard to return the mass back into its exact, originally molded shape when it was cross-linked. The molecular forces are great enough that a simple re-use of the parts is next to impossible.

Even if the parts were removed in one piece, albeit shrunken back to their original molded sizes, re-expansion is not practical. A vent hole is strategically position in a critical area after the initial expansion to frustrate attempts at re-expansion by vacuum or air pressure.

System 100 provides for verification that a product contents 102 is genuine and/or unadulterated. For example, product contents 102 can be a liquid medicine produced and distributed in a glass bottle 104 with a plastic cap 106 and a screw-top 108. A radio frequency identification device (RFID) chip 110 is embedded or secured to the screw-top 108, while a matching RFID antenna 112 it is connected to is embedded or attached to the cap 106. The arrangement is such that when screw-top 108 is opened by the user, the RFID chip 110 will be torn from its RFID antenna 112.

Before such opening, product codes and serial numbers embedded in RFID chip 110 can be interrogated over a short radio link 114 by an RFID scanner 116. Data obtained is forwarded to a movements tracking database 118. Legitimate products come from legitimate sources, and so the product codes and serial numbers can be tracked as product shipments flow from the manufacturer, through wholesalers, are aggregated in shipping containers, stationed at depots, subjected to customs inspection, stored in warehouses, sent to retailer's shelves, and, in some cases, as they are delivered to the users themselves.

Cap 106 comprises cross-linked polymers with a memory, similar to shrink tubing. Heating of such material will cause it to shrink, and if cap 106 is heated in an attempt to remove it from bottle 104, it will shrink and grip the edges of bottle 104 all the tighter. If cap 106 is ever removed successfully in one piece, it can never be reinstalled on bottle 104 because it will be smaller than it was during original manufacturing, and the top edge geometry of length and diameter will not allow the cap to be snapped on the vial or container again.

A wireless report can be interrogated over a radio link 114 by an RFID scanner 116. After any necessary decryption, identity and other codes are stored in a movements tracking database 118 for later analysis. A hologram 120 with digitally encrypted codes to verify its authenticity to a reader is placed with its reflective side against the outside wall of bottle 104. A product label 122 can be used to cover over the backside of the hologram 120. A laser 124 has its light 126 directed through the protected contents 102 to the hologram 120. A reflected light 128 will produce a light pattern signature 130 that depends on the digital encryption in the hologram 120 and the material properties and temperature of contents 102. Small changes in the chemistry or strength of the contents 102 will produce detectable differences in the character of signature 130. A camera 132 and signature analysis processor 134 are used to read, analyze, and report on the nature of the contents 102 and how it compares to a standard signature on file for this product. Deviations are then non-invasively interpreted as the product contents 102 has deteriorated, been adultered, diluted, or substituted, and therefore should not be trusted. Law enforcement and other measures can then be instituted to secure the supply chain and the manufacturer's reputation.

The typical cap embodiment of the present invention has several unique mechanical and chemically bonded polymer components designed in such a manner that various attempts at removing the cap will fail in different ways. Attempts at tampering will either be highly visible and/or cause the cap to shrink back to the significantly smaller size and different shape it was when first molded. The shrinking makes re-application impossible.

Figure 2A:
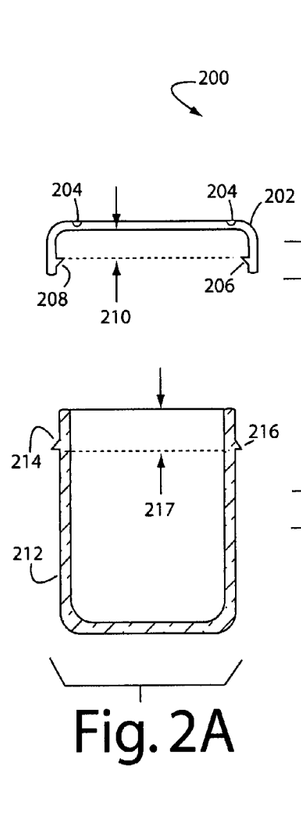
FIGS. 2A-2E show a method embodiment of the present invention for manufacturing a secure vial for high value liquid products like vaccines and other medicines, and is useful in the secure packaging system of FIG. 1.

FIGS. 2A-2E represent a method embodiment of the present invention for manufacturing a secure vial for high-value liquid products like vaccines and other medicines, and is referred to herein by the general reference numeral 200. Method 200 is useful in the secure packaging system 100 of FIG. 1. In FIG. 2A, method 200 begins with the injection molding of a cap 202 that has adhesive control grooves 204, and snap locking bottle barbs 206 and 208 inside on a cap skirt. Initially, these barbs 206 and 208 extend a first distance (L1) 210 from the top inside of the cap. A container, glass, or polymer vial 212 is provided with a snap lock closing ring or barbs 214 and 216 that match the alignment of corresponding barbs 206 and 208 on cap 202. That is, except a second distance (L2) 217 from the top of vial 212 to the flat bottoms of barbs 214 and 216 exceeds the range of L1 210 to engage the two.

Figure 2B:
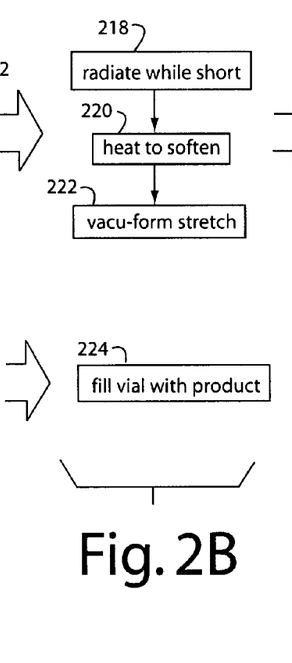

In FIG. 2B, a step 218 uses, e.g., electron beam accelerator radiation to cross-link the plastic polymers that make up the material injection-molded for cap 202. Before such radiation, the polymers can be considered to resemble a plate of spaghetti where the noodles can slide around over one another. The radiation causes a majority of the cross-overs to fuse together, or cross-link. More radiation produces more cross-linking and higher tensile strengths that will resist elongation. Excessive radiation will produce so much cross-linking that the material will not be able to stretch and become brittle and will fracture from chain-cession rather than elongate.

The size, shape, and length 210 of the cap and skirt can be fixed into a sort of plastic material "memory" by radiation step 218. A step 220 can be used to heat and soften the skirt material so it can be stretched, e.g., by-a vacuum-pressure forming process in step 222. If the material is allowed to cool below its Tg temperature in a stretched or elongated shape, it will freeze the skirt in this shape and condition until heated again above its Tg temperature. For example, heating in a criminal attempt to fraudulently remove the cap 202 from the vial 212.

A step 224, in FIG. 2B, is used to fill the vial 212 with product, e.g., contents 102 in FIG. 1.

Figure 2C:
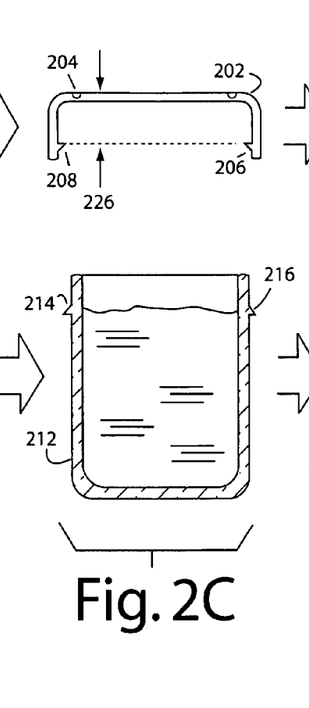

In FIG. 2C, the heating and vacuum-pressure forming of steps 220 and 222 applied to cap 202 has resulted in an increase in dimension (L3) 226. Cap 202 can now be pressed on to vial 212 and barbs 206, 208, 214, and 216 will now all engage one another. The design of the barbs is such that once engaged the cap is locked on for good. About the only way to get the cap 202 off the vial 212 is to destroy it. In any event, a cap 202 removed after its installation on vial 212 would be unusable. Heating it would cause it to shrink back (with great force) to resume the L1 210 dimension. Additionally, the ability to use the sophisticated heating and vacuum-pressure forming equipment needed for steps 220 and 222 would be nullified by the strategically placed hole in the cap. Such hole would prevent being able to apply the necessary suction/pressure needed to re-expand the part.

Even so, when cap 202 had been punctured by a syringe during normal use to extract the vaccine, drugs, or other liquid contents, the RFID device "goes dead" to immediately indicate tampering.

Figure 2D:
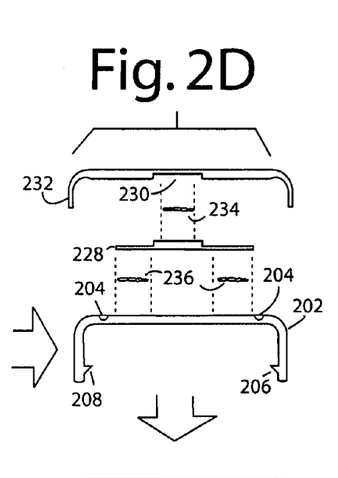

In FIG. 2D, the cap 202 and its RFID components and lid are assembled. Specifically, a registered RFID device 228 has a chip in its center that is attached in a nest 230 in a lid 232 by a dab of adhesive 234. An outer, thinner part of RFID device 228 is its snap-off antenna ring that is fastened to cap 202 by another dab of adhesive 236. Grooves 204 encircle the dab of adhesive 236 to prevent any of it from inadvertently joining cap 204 to lid 232.

Figure 2E:
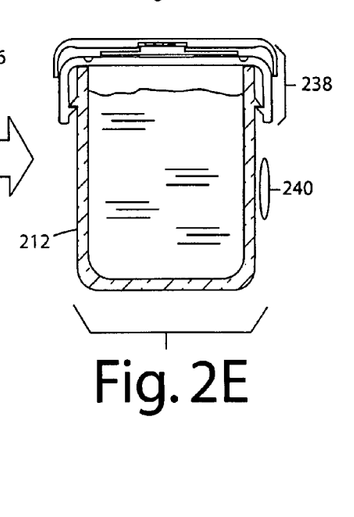

In FIG. 2E, all the components assembled in FIG. 2D combine to form a security cap 238. All this is pressed onto vial 212 to secure the product contents. A BOE hologram 240 is attached to the outside of a sidewall of vial 212 so a laser can be diffracted and reflected through and the light signature analyzed. Such BOE hologram could be positioned just about anywhere that would provide a minimal light path in and out of the vial, e.g., inside and under security cap 238.

In normal use, a medical professional or patient would remove lid 232 from cap 202 in order to access the contents of vial 212. Because of the way RFID device 228 is glued in, such removal of the lid 232 will cause the antenna and chip of RFID device to break apart and stop its functioning. Further, this will prevent anyone from obtaining any signal/information from the RFID device, which was in fact decommissioned, when the antenna leads were broken. This will unalterably reveal that the product has been used or tampered with, and can no longer be assumed to be unadulterated or valid in composition.

Figure 3:
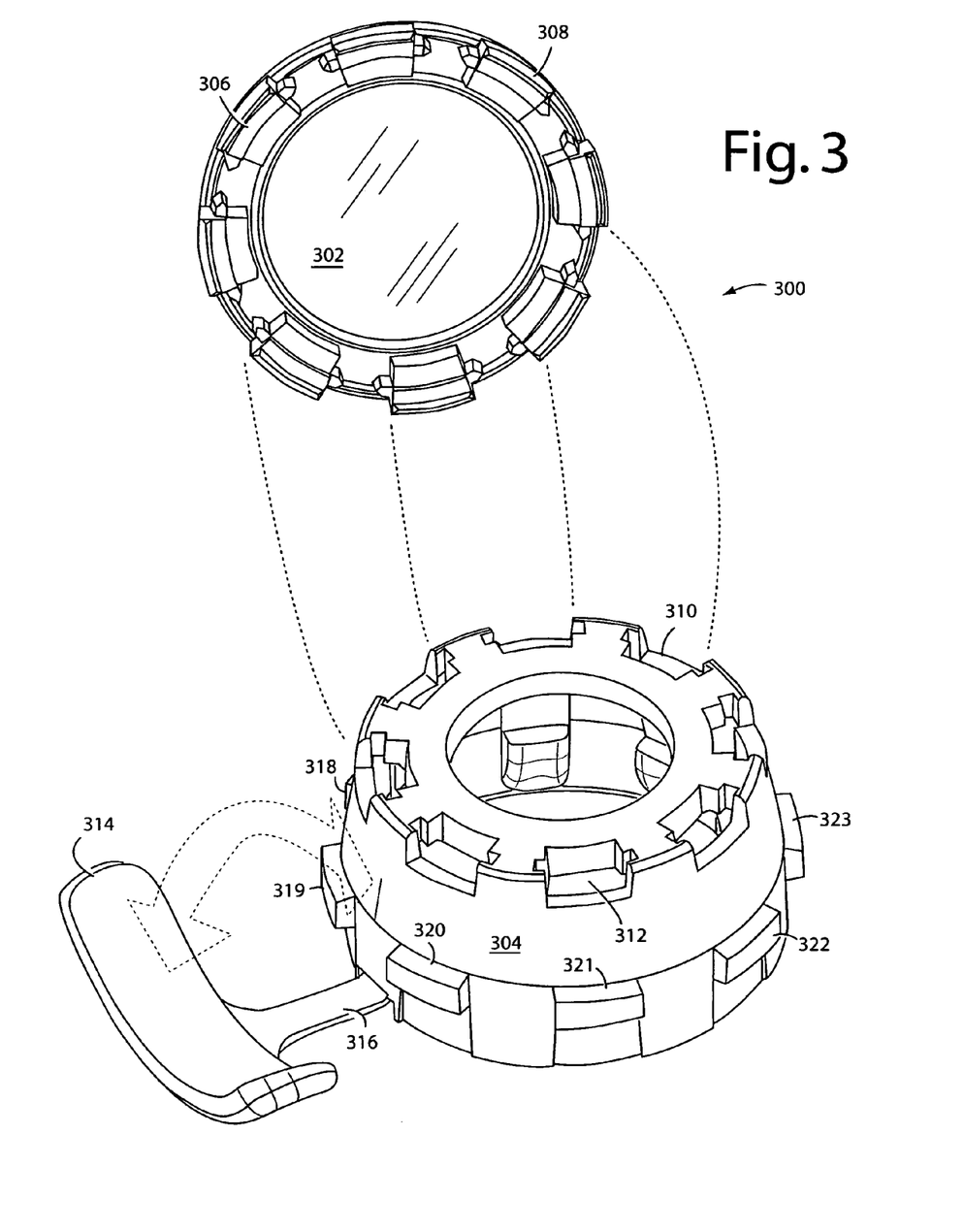
FIG. 3 is a perspective diagrams of a lid and cap embodiment of the present invention for bottles such as are used for medicines, vaccines, and other high value liquid products, and is useful in the secure vial of FIGS. 2A-2E.

FIG. 3 shows a lid and cap combination 300 in an embodiment of the present invention for bottles such as are used for medicines, vaccines, and other high value liquid products, and is useful in the secure vial of FIGS. 2A-2E. Such is referred to herein by the general reference numeral 300. A lid 302 fits on a cap 304. A circle of interlocking teeth, represented by teeth 306 and 308, fit into matching sockets, e.g., 310 and 312. A pull tab 314 is pulled away from cap 304 during use and a stem 316 creates a tear that allows the lid 302 to be released. When that happens, an RFID device that can be embedded inside is torn apart and disabled. Thereafter, the unit cannot report the package is still secure. An external ring of polymer protrusions or bosses 318-322 provide long-term stiffening to resist attempts to pry the cap off its bottle, and provide a one-time leverage for vacuum/pressure forming to stretch the sides after heating in preparation for final assembly.

Figure 4:
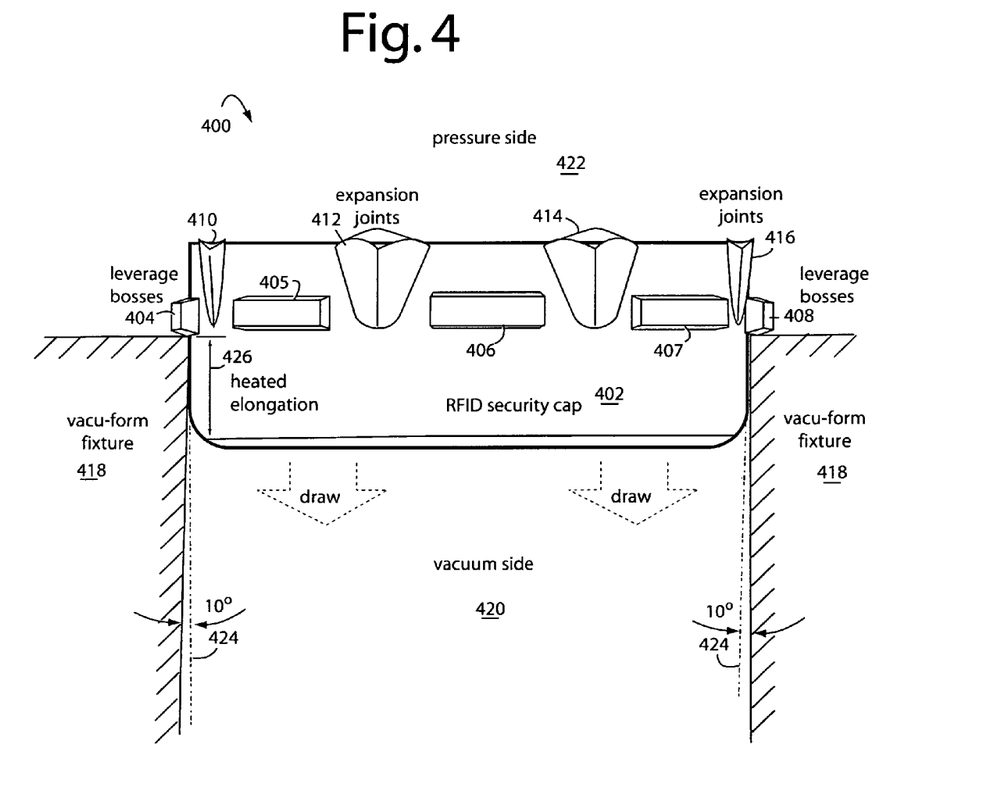
FIG. 4 is an assembly diagram showing how an RFID cap is fitted with an outside ring of bosses and a vacuum/pressure forming machine and heat are applied to draw the top of a cap down to elongate it so when it cools it can be installed on a secure vial or other bottle.

FIG. 4 shows this vacuum/pressure forming process embodiment of the present invention, and is referred to herein by the general reference numeral 400. An RFID security cap 402 is heated and stretched after being cross-linked with radiation to lock-in its physical "memory". A ring of leverage bosses 404-408 surrounds the skirt of the cap and are inter-digitated with expansion joints 410-416. The expansion joints provide a controlled amount of give to allow final assembly on the vial containing the secured product. A vacuum/pressure forming fixture 418 is basically a round hole in a metal plate with a vacuum side 420 to draw, and a pressure side 422 to push the top down while the cap is soft from heating. The fixture 418 itself could provide the source of such heating, via radio frequency (RF) or microwave radiation, and also post process cooling to lock-in the new length and width. The sides of the opening are tilted typically 8-10 degrees to make insertion and removal of the cap 402 easier. The combined vacuum and pressure are continuously applied until length and diameter 426 elongates and reaches the necessary dimensions to allow correct fit with the target vial.

The various components described herein are manufactured to extremely close fit-tolerances. Contrary, the use of conventional cap construction and manufacturing techniques will cause the parts to crack, burst or fail due to exceeding the allowable stretch or elongation of the polymer in a normal "snap-on fit", or latching seal commonly used in the majority of current security packaging applications. The extremely close fit with tight tolerances and extraordinary retained force required to maintain the seal integrity required to protect the vial contents are only accomplished by use of unique bi-folded micro expansion joints that surround the areas which need to give or expand during the installation process. The expansion joints 410-416 are sized so there is sufficient additional lateral material stretch present that can give sufficiently to allow the parts to slip over the lip and then lock. During the installation process, when the cap is forced over the vial lip, the polymer can experience stretch, tensile force extremes that exceed several thousand pounds per square inch. Attempts at re-expansion and tampering will be highly visible in these normally small and sharply pointed joints.

Figures 5A, 5B, 5C:
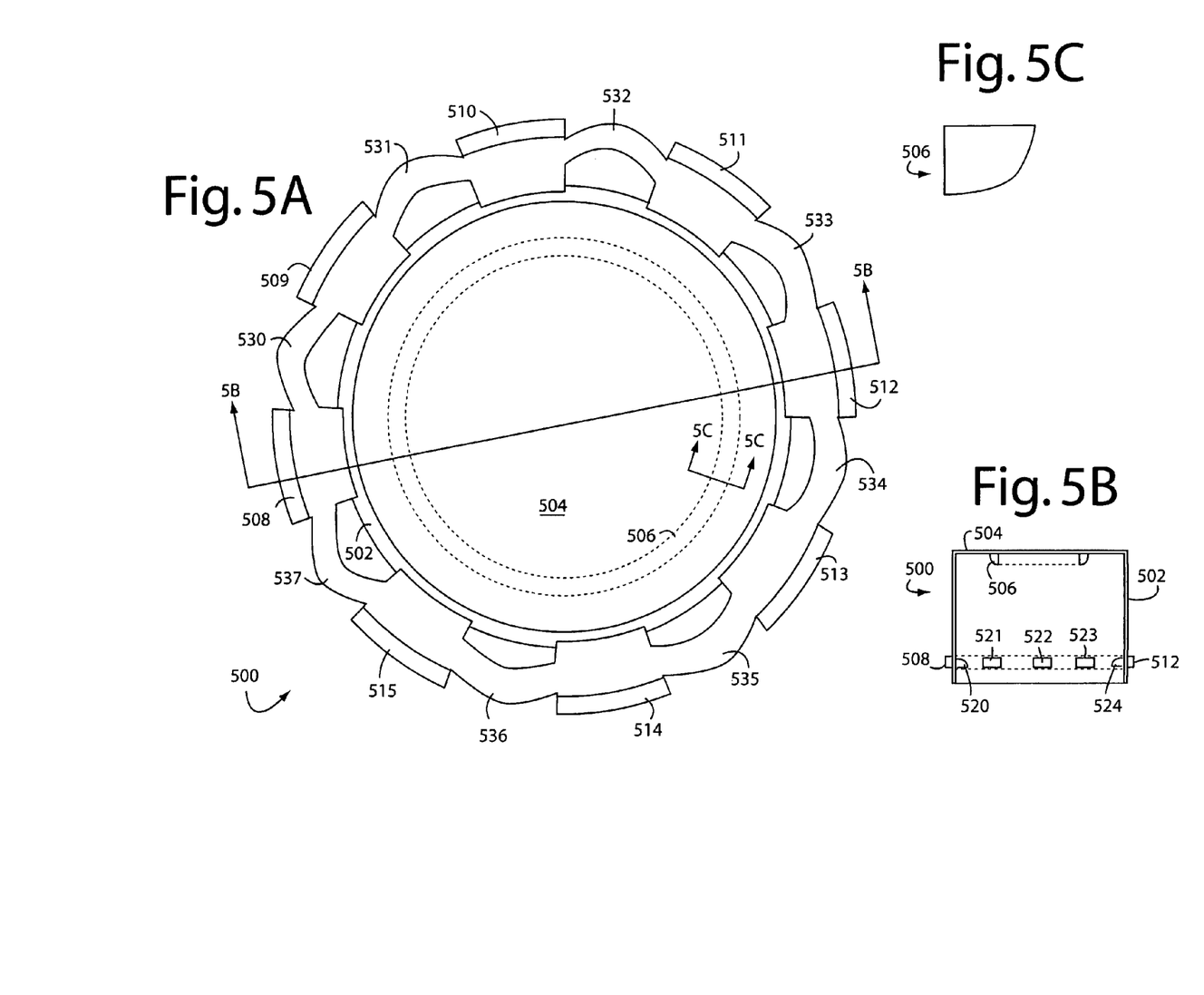
FIG. 5A is a top view diagram of a easy-on RFID cap embodiment of the present invention with expansion joints.
FIG. 5B is a cross-sectional view diagram of the cap in FIG. 5A taken along the line 5B-5B.
FIG. 5C is a profile diagram of the compression ring used on the top inside of the caps shown in FIGS. 5A and 5C and taken along the line 5C-5C.

FIGS. 5A and 5B show another security cap embodiment of the present invention, and is referred to herein by the general reference numeral 500. Cap 500 is similar to cap 402 in FIG. 4. Cap 500 includes a side skirt 502 with a top 504 and a compression ring 506. FIG. 5C shows a profile of compression ring 506. An outside ring of bosses 508-515 are aligned with an inside ring of snap locks 520-524. These are interdigitated with a number of expansion joints 530-537. The snap locks 520-524 press on and hold the cap on a vial after being heat-set, and locked-in in a vacuum/pressure forming process, e.g., as in FIG. 4

Figure 6:
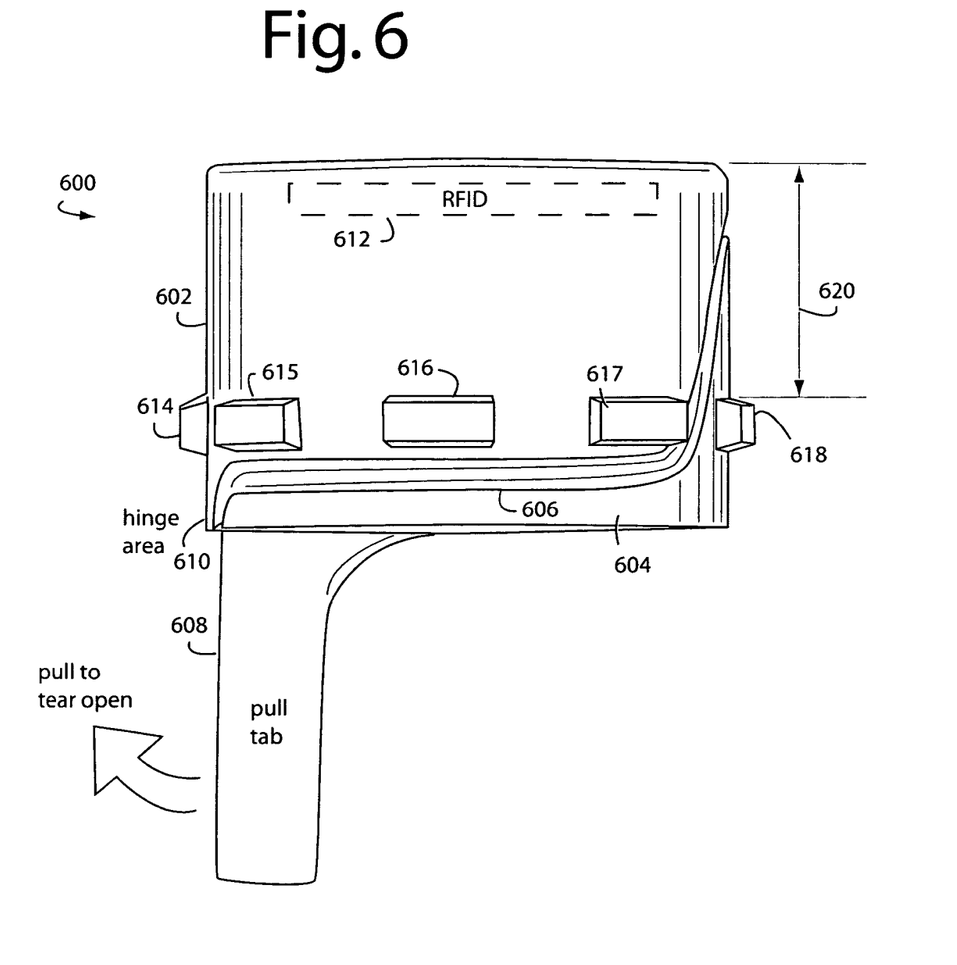
FIG. 6 is a side view diagram of a pull-tab type cap embodiment of the present invention with RFID security for a vial or bottle.

FIG. 6 shows another style of secure cap, a pull-tab cap, in an embodiment of the present invention herein referred to by the general reference numeral 600. Such pull tab cap 600 includes a top body 602 injection molded to an underbody 604 and separated by a weakened tear line 606. A pull tab 608 will turn on a hinge area 610 when a user opens the secured product. Line 606 rips open, beginning at hinge area 610, after the top outer protective cap with an embedded RFID device 612 has been twisted off and the RFID antenna leads broken. A series of bosses 614-618 are provided in an outside ring to provide leverage for heat-set elongation as described in FIG. 4.

A method embodiment of the present invention for non-invasively checking the material properties of a substance in a container begins by stamping a hologram with an encrypted digital code. Then, positioning the hologram proximate to a substance in a container such that it can be illuminated by a laser and a reflection can be viewed. A light pattern signature obtained by a laser reflection from the hologram through the substance in the container is compared to a standard signature, also contained on the same BOE hologram as well as a temperature indicating device also located on the same 1 mm chip. These images are compared to those already on file in the reader or computer. A report can be made on a material property of the protected product based on how closely the light pattern signature compares to the standard signatures on the BOE hologram, and on file. Such determinations are very sensitive and can detect very small changes in the products being protected.

In general, embodiments of the present invention use component parts that are injection-molded, e.g., from FDA approved high density polyethylene (HDPE), cyclic olefin-copolymer (COC), polyethylene terephthalate (PET), polycarbonate, and other high temperature and irradiation crosslinking prone polymers. Resins with the highest possible operating temperature ranges, and pro-irradiation crosslinking are required for the newest higher temperature sterilization applications.

The injection molded parts for each bottom cap assembly are assembled and ultrasonically welded together to produce a finished bottom cap assembly. These molded and welded bottom cap assemblies are irradiated to crosslink the molecules. Thereafter the part will always remember its originally molded shape and exact dimensions at the time of irradiation.

Once cross-linked, the bottom cap assemblies are heated just above the usual melting point of the original non-cross-linked material. A properly cross-linked polymer will soften but not melt.

If the normal melting point for a PE material was 235° C. before it was cross-linked, then when is exposed to 240° C. after being cross-linked it will be somewhat more flexible, but it will not melt or flow. The material's normal pre-cross-linked melting point after cross-linking is referred to as its glass transition point (Tg). At higher levels of cross-linking, the polymer material will become more and more brittle and not ever soften, no matter how much heat is applied. Instead, it will char, smoke, and finally degrade.

Typically, cross-linked HDPE parts are heated to a temperature of approximately 250° C. At that point, they are placed into a female cavity of a fixture, and vacuum is applied. Occasionally compressed air on the top side is used. The vacuum/pressure operation results in the part fully conforming itself to the exact shape of the cavity.

In a medical vial application, after the parts have been inspected and approved, a center needle injection point hole is made in the exact center point at the top of the cap. From this point on, the cap cannot be re-expanded. However, any parts rejected before making the center needle injection hole, can be shrunk to their original shape and size, allowed to cool down, reheated and expanded again to see if they can then pass inspection. A major advantage of this crosslinking process to the manufacturer is virtually no scrap, because the parts and trim can be used again and again until they meet all parameters and pass inspection.

The expanded parts are returned to the molding factory where an RFID and/or hologram may be added, depending on the application. If no RFID chip is required, or after one has already been installed, the pull tab as in FIG. 6 is folded up. The top security cap is placed over the bottom cap assembly, and three to six very small ultrasonic welds are made to provide some initial resistance for the twist-off feature and to protect the RFID antenna leads from accidental damage. The parts can then be sterilized and shipped.

A small silicon or rubber diaphragm is used in typical medical vials between the top security cap and the vial with the medication. The outer perimeter makes for better seals between the vial and the cap, and the diagram's middle membrane allows hypodermic needles to be inserted for the sterile removal of medications. Diaphragm designs usually allow for as much as 50% compression of the diaphragm material by the security cap. But, if a non-crosslinked cap develops a stress crack, or simply creeps over time or with elevated storage temperature, the cap moves away from the point of greatest stress, and the diaphragm's contact face can warp and leak, and the contents can be contaminated.

Recently, other plastic vial cap manufacturers have made attempts at improved seals by placing a triangular cross section type ring seal under the cap with the pointed side down towards the diaphragm, to concentrate a much greater force in the contact area. Unfortunately, such triangular or even semicircular designs used to date have forced the diaphragm towards the center of the vial opening forcing the excess diaphragm material to tent upwards in the needle access area, where it can protrude. Such tenting weakens the seal strength between the internal neck of the vial, and the surface of the diaphragm, as well as causing great difficulty in inserting and removing the needle. This becomes critical in emergency situations or with small gauge needles.

The enclosed design of the diaphragm seal intensifier can be added to any style of cap or vial to maintain an optimum seal on the diaphragm around the entire circumference of a vial, e.g., as in FIG. 5C. Such is molded into the upper, inside surface of the security cap, and is a bead of material that has a flat surface facing the center of the diaphragm, and a gradual radius from the bottom edge transitioning back into a flat angular surface radiating outwards at roughly a 45 degree angle towards the outside of the diaphragm circumference.

The diaphragm membrane in the central needle insertion part of the security cap is forced downwards. The maximum possible pressure is directly placed on the area of the diaphragm that is in contact between the vial lip face surface and the security cap. The downward directed force also pushes the diaphragm material away from the neck of the vial, opposite of tenting. The excess diaphragm material is pushed harmlessly towards the outside areas of the vial cap sealing area.

Using tabs and fingers depressed during insertion of one part onto another, which then expand and lock the two components into place, is nothing new in the field of packaging or polymers.

Prior art polymer caps in such applications have comprised simple injection molded caps with two or more simple flaps of sprung plastic material. These have ramps leading to a latching tab that snaps over the bigger vial lip or container lid. Once stretched past the maximum diameter, the latches spring back into their original shape and lock the components from being removed or taken apart. On close inspection, it can be observed that conventional latches have a straight smooth ramp area leading up to a point of maximum diameter. The actual locking face protrudes under the surface of the vial lip or lid by just a few thousandths of an inch, e.g., to prevent the parts from being separated.

In addition to being susceptible to leakage or slip of this few thousandths of an inch of coverage, caused by the reduced tensile properties of non crosslinked materials, the existing polymers have required this straight ramp design be utilized to prevent the cap from cracking or splitting apart during insertion. Additionally, this straight ramp design also does not provide any stabilization at the lower levels of the cap where it is needed to provide stabilization of the cap, on the neck of the bottle or Vial. Without this stabilization area on the cap ramp, the cap can move and float around on the neck diameter of the vial.

Such loose fitting allows air to leak in or the contents to leak out. The security cap latching fingers include a smooth, but raised transition ramp to ease the finger latching, while maintaining a stabilization point lower down on the neck portion of the vial cap. Additionally, no less then six sections are used, instead of only two to four typically used in conventional applications. Finally, on each individual transition latch finger, the top mating surface is tilted downwards, and away from the center of the vial by several degrees. When these transition fingers have snapped back into their final locking position, the cap will be locked into tight alignment, and any force applied to try to remove the cap, actually applies even greater force via these downward sloped finger tops to re-center the cap exactly on the centerline of the vial. This results in an extremely stable cap, and enables the diaphragm seal intensifier to maintain a uniform optimum seal pressure and position against the exact center line of the stabilized mating face of the vial or container. The Expansion retaining bars are distributed evenly around the outside circumference of the security cap. These small protrusions of polymer material are lined up with the internal centering and locking finger latches. The placement of these two different function components atop one another, more than doubles the wall thickness at the bottom of the latching fingers, and greatly increases the overall strength of the cap to removal. The Expansion retaining bars provide leverage in a vacu-form cavity to hold the parts firmly in place during expansion, while vacuum and air pressure are applied. Heating, vacuum, and pressure are combined to lengthen and increase the diameter or the parts to their proper dimensions. Once the parts have been expanded to their proper dimensions, the cap fingers will be then be able to lock over the ring lip on the vial, around the entire diameter of the part. This same expansion operation, also maintains a critical and uniform spacing between the lower cap and vial, and between the lower cap, and the upper security cap.

With the expansion retaining and spacer bars in position, and the latching fingers locked in place, the outer security cap is then installed and welded in place.

There is now, no where for any portion of the lower cap, or outer security cap to go if any attempt is made to pry the caps off the vial or container. The application of any force to any portion of the Security Cap only results in the All portions of the cap being held together even tighter and focuses this energy or force towards the RFID device and antenna which are deigned to fail and alter to tampering attempts.

Highly secure product packaging systems should be virtually impenetrable so as to protect consumers from tampered, counterfeit, diluted or adulterated products. In general, this means the caps and containers must be extremely strong, tamper evident, and provided with anti-counterfeit protection systems. At the same time, these very secure packaging system, must also allow a simple means of entry for very often young children must be able to access the bottled medicines and treat themselves with the products being protected.

So opening the products should not be difficult. Other situations also require authorized accesses to be rapid and simple, sometimes the situation just doesn't allow for complex packaging or slow, one injection at a time withdrawals.

Conventional medical vials use an aluminum metal crimp ring around their tops. It is common practice in operating rooms to open these medical vials with cutters or pliers to pull off the crimp ring that secures the diaphragm to the vial. The cut metal pieces can be sharp, dangerous, and need to be carefully disposed of. Besides being dangerous, it is often physically difficult and time consuming to open vials this way.

A visible pull tab can be presented with a product label applied over the tab. Pull tabs can been fabricated in an inverted "T" configuration, e.g., with two curved finger grips sized for a small child's fingers. A hinge 610 is near a narrow part of the "T" handle so the "T" can be mechanically folded up against the cap. The curvature of the grip should match the curvature of the expanded diameter and length vial. The handle width encircles half way around the expanded diameter of the vial.

The pull tab is placed between the external expansion retaining and expansion joints, e.g., replacing one of the molded-in locking, polymer expansion joints. Such assists in the removal of the cap with the pull tab, without sacrificing any loss of strength or compromising the anti-tamper characteristics. The tear propagation grooves 606, on the inside of the lower security cap and directly behind and on both sides of the tear tab, assist in the removal of the entire pull tab with the least possible force. To date there have been 3 specifically designed tear tabs developed for customers with both flat pull tabs, spiraling upward pull tabs, and folded-up and hidden pull tabs beneath the outer security cap of the Referring again to FIG. 2B, after expansion of the part to in step 222 its final dimensions, a small ⅜-½" inch hole is mechanically punched into the top of the lower security cap 202.

Such hole makes any future expansion impossible. The fluted external security cap, e.g., 232, is placed over the entire assembly with the "T" pull handle (e.g., 314 in FIG. 3, and 608 in FIG. 6) folded into its upright position. The external security cap is ultrasonically welded in various points and to various lengths, depending on how much twist off force is desired to be present in the finished product.

If RFID reporting and seal integrity are required, an RFID chip and antenna (e.g., 612) are inserted just prior to the external security cap being applied. These are secured in place with a dispensed cross-linking adhesive 234 or 236, e.g., into a 0.020" deep ring groove 204, FIGS. 2A-2E. This way, when the top security cap is twisted off to allow access, for example to a pull tab, the twisting action breaks the antenna leads away from the RFID chip.

A binary optically encrypted foil (BOE), e.g., hologram 240 in FIG. 2E, is similar to technology developed for the automotive automobile steering and parking systems. In embodiments of the present invention, a three-dimensional (3D) binary optically encrypted hologram image is placed on a one millimeter square piece of polymer film with a sputtered reflective coating. Such image target is put backwards under a label on the side of any transparent vial, bottle, or container. A red or green laser beam can then be directed through the other side of the vial, through the liquid, through the second side of the vial or bottle and aligned on the 1 mm spot of this BOE hologram. The surface of this 3D "deep" hologram then diffracts and reflects portions of the laser light back through the same two walls of the container and the solution contained within them.

A programmed "X" crosshair image is incorporated into the hologram, thus added to the returning Diffracted/reflective image. The exiting laser image is in focus from the point it leaves the second container surface to infinity. The diffracted/reflected image of interest, is located at the very center of the cross-hair projected image can be seen with the unaided eye as a series of clearly defined but very small dots. If an optical sensor array is used to receive the image, the output an be fed into a computer. A magnified and color enhanced image is stored n a library file. The placement, specific location in relationship to the exact center of the cross-hair image, the spacing between points, number of points, and grouping of points are uniquely indicative of the specific compound or solution being examined.

Such system is not intended as an analytical tool for Identifying an unknown liquid, but rather as a qualitative instrument for determining if the image matches a standard -21- already on file. If the image does not match, for the known image of the solution on file, the material is probably adulterated, diluted, counterfeited, or some completely different solution all together. The images are also sensitive to temperature. To resolve this variable, a specialized BOE hologram includes a temperature indicating grid on the same hologram surface, as well as two "typical" stored images for the known solution at the upper and lower thermal limits the solution might be exposed to. All this is present on a single 1 mm square foil hologram.

A computer program is then used to compare the diffracted image between the two standard images, and to verify if the solution is authentic and allowable for consumer use.

In recent experiments, the sensitivity of detection is about four hundred parts-per-million (400 ppm). Work on more sensitive optical sensors is continuing and future detection levels are anticipated to be 1-ppm or better.

A control sample of 99% pure isopropyl alcohol in a closed vial was used in a test as a control sample. Within seconds of being exposed to ambient air, the solution absorbs enough water vapor from the air to significantly affect the diffracted hologram image. If the vial is re-sealed and allowed to stabilize for several seconds, the diffracted image will fix at a new pattern different from the first. Similarly, samples of various common medical compounds in sealed multiple injection style vials have been examined. The images obtained were consistent and repeatable. But if one-twelfth of one milliliter of distilled water was added to a fifteen milliliter vial, a permanent change in the diffracted image could detected within ten seconds. The basic principal at work here is the Bragg Effect.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the "true" spirit and scope of the invention.

The invention claimed is:

1. A security package for a protected product, comprising:
a vial for holding a protected product, and having an snap lock closing ring in its opening to receive a cap;
a cap for closing and securing said protected product within the vial, and having individual snap locking bottle barbs inside a cap skirt to engage said snap lock ring;
a RFID device embedded in the cap and able to report to an RFID scanner its identity and operation, and mounted such that an ordinary opening of the cap on the vial will cause it to permanently malfunction; and
a cross-linked polymer material from which the cap has been molded and radiated such that the cap will not close over the vial because of its too short skirt length and the relative position of its said snap locking bottle barbs.

2. The security package of claim 1, further comprising:
an outside ring of leverage bosses on said cap skirt able to assist in vacuum/pressure forming to elongate the cap after heating.

3. The security package of claim 2, wherein:
each of the leverage bosses are aligned with and adjacent to corresponding ones of said snap locking bottle barbs inside said cap skirt.

4. The security package of claim 1, further comprising:
a series of expansion joints interdigitated with individual ones of the outside ring of leverage bosses on said cap skirt and providing for easier assembly during manufacturing of the cap onto the vial.

5. The security package of claim 1, further comprising:
a three-dimensional binary optically encrypted (BOE) hologram placed backwards under a label on the side of the vial such that a laser beam can be directed through the backside of the vial, through the contents, and to the hologram;
wherein, product packaging is provided to validate genuine products are really inside their containers.

6. The security package of claim 5, further comprising:
a signature caused by a light pattern reflected by the hologram that can be analyzed to non-invasively determine if said protected product is genuine and unadulterated.

7. The security package of claim 1, further comprising:
an RFID scanner able to read wireless identification reports from the RFID device that include product codes and serial numbers; and
a movements tracking database;
wherein, data obtained by the RFID scanner is forwarded to the movements tracking database such that said product codes and serial numbers can be tracked as product shipments flow to the users themselves.

8. The security package of claim 1, further comprising:
a database for collecting data from a plurality of RFID scanners positioned at various product distribution points and able to track movements of said protect product in the market distribution channels and report on the legitimacy of their sources.

9. A method for securing product packages, comprising:
molding a plastic cap to be too small to fit on a bottle for containing a protected product;
cross-linking polymers in said plastic cap with an exposure to radiation such that the inadequate size of said plastic cap is fixed into its physical memory;
heating said plastic cap after molding and cross-linking to soften it;

elongating said plastic cap while soft in a fixture that applies vacuum and/or pressure such that said plastic cap will fit said bottle after cooling; and installing said plastic cap on said bottle;

wherein removing said plastic cap from said bottle thereafter is reduced to a choice between ripping said polymers and heating them to soften them but suffering a return to said too small size by a return to its physical memory.

10. The method of claim 9, further comprising:
embedding an RFID device in said plastic cap such that opening or forcing off the cap from said bottle will disable any RFID function.

11. The method of claim 9, further comprising:
using molded-in bosses disposed on a skirt of said plastic cap to help as leverage with the step of elongating.

12. The method of claim 9, further comprising:
RFID scanning and collecting reports into a database to track movements of said protected product through its distribution channels and to report on its apparent authenticity.

13. A business model for ensuring genuine products reach their consumers, comprising:
packaging a protected product in an enclosure with an RFID device that will respond with an identification code when interrogated by an RFID scanner;

tracking individual RFID devices through a plurality of RFID scanners at respective locations as said protected product moves from manufacture to ultimate use through its expected distribution channels;

placing a hologram with a digitally encrypted code on said protected product such that a laser light passing through said protected product and reflected from said hologram will have light pattern signatures that depend on said digitally encrypted code and the material properties and temperature of said protected product, and wherein any differences in the chemistry or strength of said protected product are detectable as variations in said light pattern signatures from a standard signature on file for said protected product; and reporting whether particular protected products in their packages can be assumed to be genuine and uncompromised based on reports logged into a central database by said plurality of RFID scanners and any scans and interpretations of said light pattern signatures.

14. The business model of claim 13, further comprising:
scanning and comparing a light pattern signature obtained by a laser reflection from a hologram through said protected product to a standard signature on file.

15. The business model of claim 13, further comprising:
packaging said protected product in a vial with a plastic cap that has been radiated to cross-link its material into a physical memory in which said cap is too small to fit on said vial unless said cap is first heated, elongated in a fixture, and then cooled to fit a larger size.

16. The business model of claim 13, further comprising:
packaging said protected product in a bottle with a plastic cap and an RFID device in which an RFID chip will be torn from its RFID antenna when said bottle is opened.

17. A method for non-invasively checking the material properties of a substance in a container, comprising:
stamping a hologram with an encrypted digital code;

positioning said hologram proximate to a substance in a container such that it can be illuminated by a laser and any reflection passing through said substance can be viewed;

comparing a light pattern signature obtained by a laser reflection from said hologram through said substance in said container to a standard signature on file; and reporting on a material property of said protected product based on how closely said light pattern signature compares to said standard signature on file.

\* \* \* \* \*